United States Patent
Locher et al.

(10) Patent No.: US 10,006,504 B2
(45) Date of Patent: Jun. 26, 2018

(54) METHOD FOR CONTROLLING A HYDRAULIC-MEDIUM SUPPLY SYSTEM OF AN AUTOMATIC TRANSMISSION

(71) Applicant: ZF Friedrichshafen AG, Friedrichshafen (DE)

(72) Inventors: Karl Locher, Pfronstetten-Tigerfeld (DE); Alexander Hoffmann, Lebach (DE); Rainer Novak, Bregenz (AT); Martin-Joachim Bader, Mochenwangen (DE); Markus Terwart, Thundorf (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 0 days. days.

(21) Appl. No.: 15/123,634

(22) PCT Filed: Feb. 6, 2015

(86) PCT No.: PCT/EP2015/052478
§ 371 (c)(1),
(2) Date: Sep. 3, 2016

(87) PCT Pub. No.: WO2015/132035
PCT Pub. Date: Sep. 11, 2015

(65) Prior Publication Data
US 2017/0074332 A1    Mar. 16, 2017

(30) Foreign Application Priority Data

Mar. 6, 2014 (DE) .................. 10 2014 204 072

(51) Int. Cl.
F16H 57/04    (2010.01)
F16D 25/12    (2006.01)
(Continued)

(52) U.S. Cl.
CPC .......... *F16D 25/123* (2013.01); *F16D 25/14* (2013.01); *F16H 57/0412* (2013.01);
(Continued)

(58) Field of Classification Search
None
See application file for complete search history.

(56) References Cited

U.S. PATENT DOCUMENTS 7,951,043 B2    5/2011    Reisch et al.
8,187,151 B2    5/2012    Gloge
(Continued)

FOREIGN PATENT DOCUMENTS

DE    102005013137 A1    9/2006
DE    102008040665 A1    6/2010
(Continued)

OTHER PUBLICATIONS

German Search Report DE102014204072.8, dated Nov. 10, 2014. (7 pages).
(Continued)

*Primary Examiner* — Justin Holmes
(74) *Attorney, Agent, or Firm* — Dority & Manning, P.A.

(57) ABSTRACT

A method for controlling a hydraulic fluid supply system of an automatic transmission of a motor vehicle includes supplying the hydraulic fluid supply system with hydraulic fluid from at least one of a hydraulic pump controlled on an engine side and a hydraulic pump controlled on a gear set side. The method also includes controlling a cooling valve of the hydraulic fluid supply system as a function of detected motor vehicle parameters in order to set an adjusted power distribution with the hydraulic pump controlled on the engine side and the hydraulic pump controlled on the gear set side.

10 Claims, 2 Drawing Sheets

(51) Int. Cl.
*F16D 48/02* (2006.01)
*F16H 61/00* (2006.01)

(52) U.S. Cl.
CPC ..... *F16H 57/0435* (2013.01); *F16H 57/0441* (2013.01); *F16H 57/0446* (2013.01); *F16H 57/0473* (2013.01); *F16H 61/0025* (2013.01); *F16H 2061/0037* (2013.01)

(56) References Cited

U.S. PATENT DOCUMENTS

| | | | |
|---|---|---|---|
| 2003/0059310 A1* | 3/2003 | Koenig | F04B 17/03 417/16 |
| 2004/0074732 A1* | 4/2004 | Busold | F16D 21/06 192/48.601 |
| 2010/0018808 A1* | 1/2010 | Gloge | F16H 61/0031 184/6.12 |
| 2012/0055146 A1 | 3/2012 | Baraga et al. | |
| 2012/0103709 A1* | 5/2012 | Mochiyama | F16H 61/0031 180/65.21 |
| 2012/0279210 A1 | 11/2012 | Strauss | |
| 2013/0213043 A1* | 8/2013 | Kasuya | F02B 63/04 60/700 |
| 2014/0048355 A1 | 2/2014 | Pfleger | |
| 2015/0135876 A1* | 5/2015 | Novak | F16H 61/0031 74/473.11 |

FOREIGN PATENT DOCUMENTS

| | | |
|---|---|---|
| DE | 102009019959 A1 | 11/2010 |
| DE | 102011075411 A1 | 11/2012 |
| DE | 102011077552 A1 | 12/2012 |
| DE | 102012214495 B3 | 12/2013 |

OTHER PUBLICATIONS

International Search Report (English Translation) PCT/EP2015/057478, dated Mar. 26, 2015. (2 pages).

* cited by examiner

METHOD FOR CONTROLLING A HYDRAULIC-MEDIUM SUPPLY SYSTEM OF AN AUTOMATIC TRANSMISSION

FIELD OF THE INVENTION

The present invention relates generally to a method for controlling a hydraulic fluid supply system of an automatic transmission of a motor vehicle.

BACKGROUND

Automatic transmissions require at least one hydraulic fluid supply system for the hydraulic fluid supply of transmission elements such as shift elements or the like. For the hydraulic fluid supply of the system, one hydraulic pump controlled on the engine side and one hydraulic pump controlled on the transmission output side or on the gear set side are typically provided. The provided hydraulic pumps may be allocated to separate hydraulic fluid circuits or systems, such that the hydraulic pump controlled on the engine side is used to generate system pressure and the hydraulic pump controlled on the gear set side is used to cool the gear set. Thus, the hydraulic pumps operate structurally separate oil circuits or hydraulic fluid supply circuits, and thus are not able to support each other. Allocating the hydraulic pumps to a common hydraulic fluid supply circuit is also known.

In a disadvantageous manner, it has been found that, with certain operating modes of the motor vehicle, such a hydraulic fluid supply, for example, does not make available system pressure for actuating shift elements, such that, during predetermined operating modes, due to a lack of system pressure, gear tracking or clutch filling (for example) is not possible.

SUMMARY OF THE INVENTION

Exemplary aspects of the present invention control a hydraulic fluid supply system of the type described above, which ensures a consumption-optimized control of the hydraulic fluid supply system of the automatic transmission.

A method for controlling one or more hydraulic fluid supply systems of an automatic transmission, in particular a dual-clutch transmission, of a motor vehicle is proposed, whereas the hydraulic fluid supply system is supplied with hydraulic fluid at least by one hydraulic pump controlled on the engine side and by one hydraulic pump controlled on the gear set side. A cooling valve of the hydraulic fluid supply system for oil or hydraulic fluid supply is controlled as a function of detected motor vehicle parameters or the like for setting an adjusted consumption-optimized power distribution with the hydraulic pumps.

Accordingly, the respective operating mode of the motor vehicle is initially determined, and, as a function of the detected operating mode, a suitable control of the hydraulic pumps through the cooling valve is realized, in order to thereby undertake a consumption-optimized power distribution with the hydraulic pumps for the hydraulic fluid supply. For example, the motor vehicle parameters can be detected by the electronic transmission control and evaluated accordingly, in order to recognize the operating modes, which are stored as models. The cooling valve is controlled according to the predetermined operating modes, and thus occupies different shift positions.

For example, different operating modes can be detected with the proposed method. With the first operating mode, the motor vehicle is, for example, in the non-coasting state; i.e., the coasting function is deactivated. Within the framework of the first operating mode, even at low speed, the motor vehicle may be in the coasting state with an additional request to start the engine.

A second operating mode is, for example, the activated coasting function with the engine running at low speed. Within the framework of a third operating mode, the motor vehicle is in coasting state without the engine running. It is also possible that the motor vehicle is in the third operating mode with the engine running in coasting state. Finally, in the fourth operating mode (for example, when traveling at high speed), the motor vehicle is in non-coasting state. Additional operating modes can be detected by the method in accordance with exemplary aspects of the invention.

BRIEF DESCRIPTION OF THE DRAWINGS

The present invention is further described below with reference to the drawings. The following is shown.

DETAILED DESCRIPTION

Figure 1:
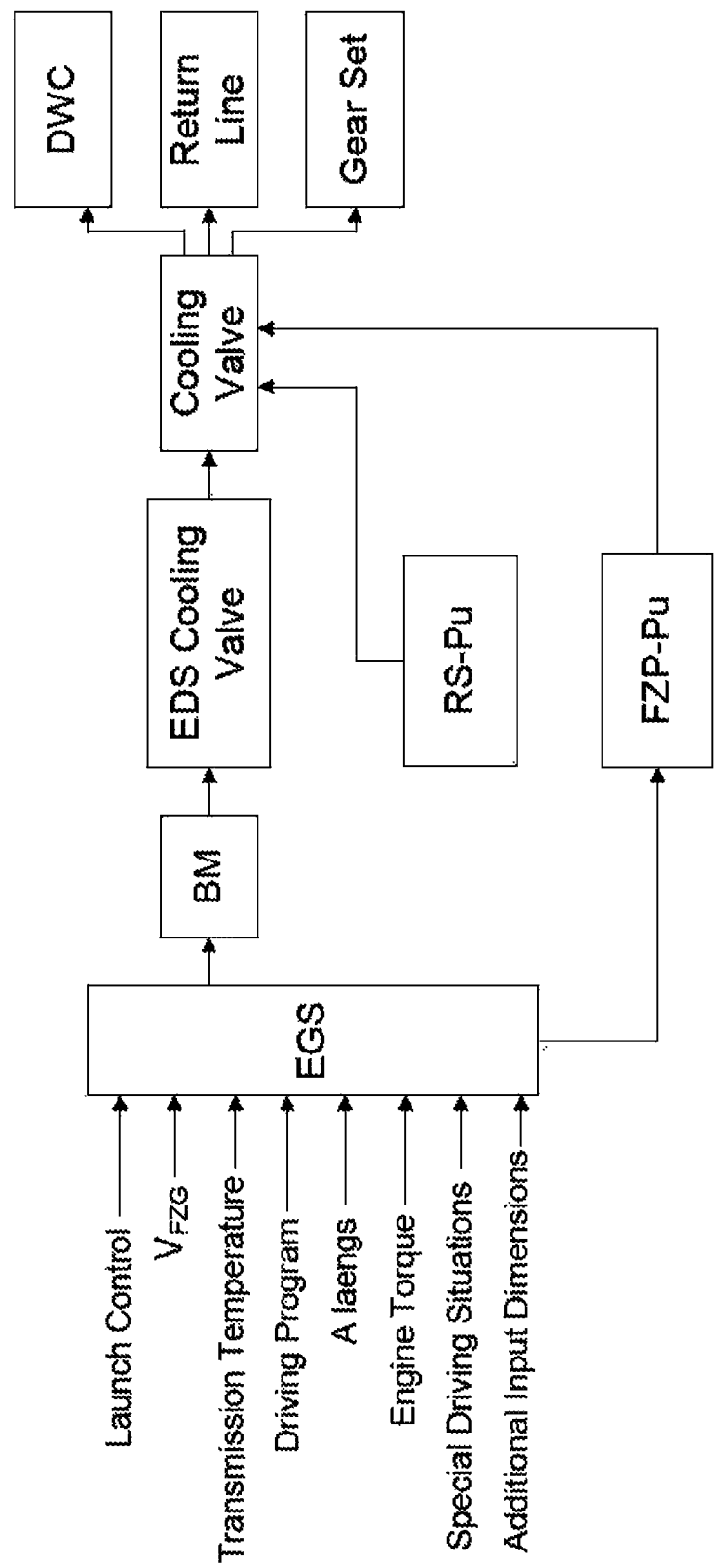
FIG. 1 a schematic view of a hydraulic fluid supply system of an automatic transmission of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 schematically presents an example of a hydraulic fluid supply system for an automatic transmission, in particular a dual-clutch transmission, of a motor vehicle. The hydraulic fluid supply system comprises a hydraulic circuit, which is provided for cooling and actuating, along with the lubrication of transmission elements of the automatic transmission. The hydraulic fluid circuit is supplied with hydraulic fluid or oil through a hydraulic pump FZP-Pu controlled on the drive side and a hydraulic pump RS-Pu controlled on the gear set side. The hydraulic fluid circuit is connected to a return line to the oil cooler and to the hydraulic fluid sump. In the hydraulic fluid supply system, a cooling valve, with which the volume flows can be regulated, is also arranged. The cooling valve is controlled by an electric pressure regulator EDS. This has the advantage that the hydraulic fluid or cooling oil volume flow can be produced and distributed in a manner optimized for demand and degree of efficiency. In the control, a characteristic map with corresponding models or a matrix with various operating modes may also be stored. The inflowing or necessary and outflowing volume flow are constantly determined, and, from this determination, the generation of volume flow or distribution of volume flow may be varied through the predetermined operating modes. In addition, the operating modes are variable based on the incoming parameters with reference to the generation and distribution of volume flow. This means that, for example, upon a sharp increase in the transmission oil temperature, the volume flow of the currently predetermined operating mode may change as a function of temperature, and the total volume flow is thus increased to reduce the transmission oil temperature.

Through the electronic transmission control EGS, various motor vehicle parameters are detected and evaluated. Based on the evaluated motor vehicle parameters, a corresponding operating mode BM, such as BM1, BM2, BM3, BM4, BM5, . . . , is determined. Within the framework of the flow chart presented as an example, as the first operating mode BM1, the driving state is detected in the non-coast state, whereas, alternatively, as the first operating mode BM1, the state is detected at which the motor vehicle is at low speed with an additional request to start the engine in coasting state. As a possible second operating mode BM2, the driving state can be detected at which the motor vehicle is in coast driving state with the engine running at low speed. As the third operating mode BM3, the driving state can be detected at which the motor vehicle is in coasting state without the engine running. Alternatively, with the third operating mode BM3, the state can be detected at which the motor vehicle is in coasting state with the engine running. Within the framework of the fourth operating mode BM4, the state can be detected at which the motor vehicle is in non-coasting state at high speed. Finally, additional operating modes BM5, etc. can also be detected by the method.

Corresponding control models for the cooling valve are allocated to the respective operating mode BM1, BM2, BM3, BM4, whereas the corresponding control takes place by the electric pressure regulator EDS. In this manner, corresponding shift positions are set with the cooling valve, such that the hydraulic fluid supply, for example, for the supply of dual-clutch DWC, for the cooling and lubrication of the gear set or the like, is ensured, whereas excess hydraulic fluid is allocated to the return line, thus to the cooler and the sump.

For the hydraulic fluid supply of hydraulic fluid supply system, both a hydraulic pump or a vane pump FZP-Pu controlled on the engine side and a hydraulic pump RS-Pu controlled on the gear set side are allocated.

As possible motor vehicle parameters, the electronic transmission control EGS, for example, the launch control, the motor vehicle speed $V_{FZG}$, the transmission oil temperature, the respective driving program, the motor vehicle longitudinal acceleration a_laengs, the engine torque, special driving situations, such as (for example) start-stop operation and increased slip operation or the like, may be detected.

Figure 2:
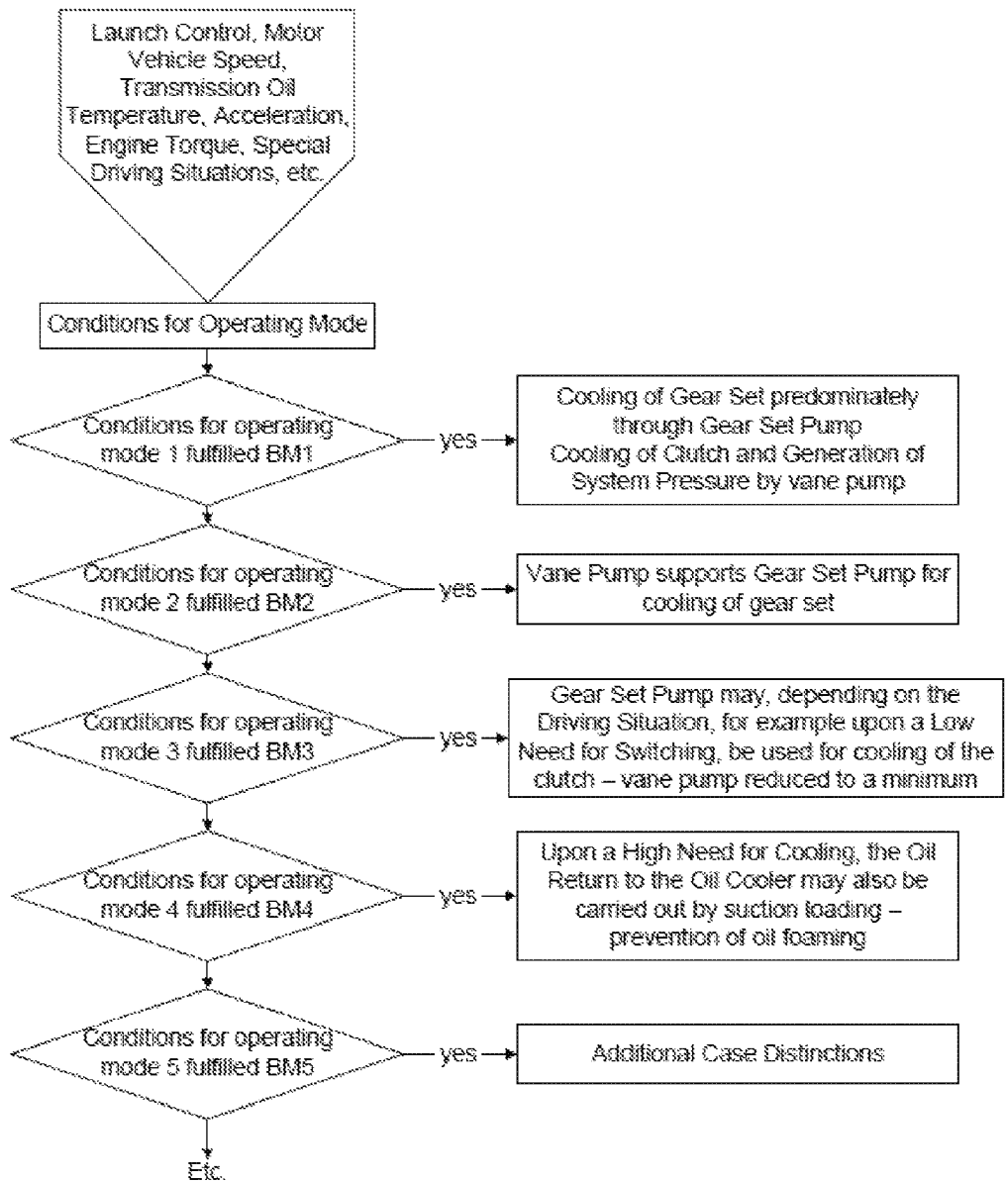
FIG. 2 a schematic view of a possible flow chart of the method in accordance with exemplary aspects of the invention for controlling the hydraulic fluid supply system.

FIG. 2 presents an example of a corresponding flow chart of the proposed method or the proposed approach. Initially, the conditions for the existence of a corresponding operating mode BM1, BM2, BM3, BM4 are determined from the detected motor vehicle parameters.

If the conditions for the first operating mode BM1 are fulfilled, the cooling of the gear set is carried out mainly by the hydraulic pump RS-Pu controlled on the gear set side. The cooling of the clutch or dual clutch and the generation of the system pressure for actuating the shift elements are carried out by the hydraulic pump FZP-Pu controlled on the engine side.

If the conditions for the second operating mode BM2 are fulfilled, for cooling the gear set in corresponding driving situations, such as (for example) upon a so-called "race start" or at a low speed of the motor vehicle, the hydraulic pump RS-Pu controlled on the gear set side is supported by the hydraulic pump FZP-Pu controlled on the engine side.

If the conditions for the third operating mode BM3 are fulfilled, the gear set pump and/or the hydraulic pump RS-Pu controlled on the gear set side can be switched for cooling the clutch depending on the driving situation, for example, when there is a low demand. Thereby, the delivery capacity of the vane pump and/or the hydraulic pump FZP-Pu controlled on the engine side can be reduced to a minimum.

If the conditions for the fourth operating mode BM4 are fulfilled, upon a high demand for cooling, the oil return to the oil cooler is also carried out by suction loading, which, advantageously, results in a prevention or reduction or oil foaming.

Modifications and variations can be made to the embodiments illustrated or described herein without departing from the scope and spirit of the invention as set forth in the appended claims.

REFERENCE SIGNS

EGS Electronic transmission control
$V_{FZG}$ Motor vehicle speed
a_laengs Longitudinal acceleration
BM1 First operating mode
BM2 Second operating mode
BM3 Third operating mode
BM4 Fourth operating mode
BM5 Additional operating mode
EDS Electromagnetic pressure regulator
DWC Dual clutch
FZP-Pu Hydraulic pump or vane pump controlled on the engine side
RS-Pu Gear set pump

The invention claimed is:

1. A method for controlling a hydraulic fluid supply system of an automatic transmission of a motor vehicle, comprising:
    supplying the hydraulic fluid supply system with hydraulic fluid from at least one of a hydraulic pump controlled on an engine side and a hydraulic pump controlled on a gear set side;
    controlling a cooling valve of the hydraulic fluid supply system as a function of detected motor vehicle parameters in order to set an adjusted power distribution with the hydraulic pump controlled on the engine side and the hydraulic pump controlled on the gear set side; and
    determining an operating mode of the motor vehicle for the cooling valve as a function of the detected motor vehicle parameters;
    wherein the detected vehicle parameters comprise one or more of a launch control status, a motor vehicle speed, a transmission oil temperature, a driving program status, a motor vehicle longitudinal acceleration, an engine torque, a start-stop operation status and a slip operation status; and
    wherein controlling the cooling valve comprises controlling the cooling valve such that a gear set is cooled by the hydraulic pump controlled on the gear set side, a clutch is cooled by the hydraulic pump controlled on the engine side, and a system pressure is generated by the hydraulic pump controlled on the engine side when the operating mode is a first operating mode, the motor vehicle being in a coasting state with a request to start an engine in the first operating mode.

2. The method of claim 1, wherein controlling the cooling valve comprises controlling the cooling valve such that a gear set is cooled by the hydraulic pump controlled on the gear set side, a clutch is cooled by the hydraulic pump controlled on the engine side, and a system pressure is generated by the hydraulic pump controlled on the engine side when the operating mode is a first operating mode, the motor vehicle being in a non-coasting state in the first operating mode.

3. The method of claim 1, wherein controlling the cooling valve comprises controlling the cooling valve such that the hydraulic pump controlled on the gear set side is supported by the hydraulic pump controlled on the engine side for cooling a gear set when the operating mode is a second operating mode, the motor vehicle being in a coasting driving state with an engine running at low speed in the second operating mode.

4. The method of claim 1, wherein controlling the cooling valve comprises controlling the cooling valve such that a gear set is cooled by the hydraulic pump controlled on the gear set side and a clutch is cooled by switching the hydraulic pump controlled on the gear set side when the operating mode is a third operating mode, a conveying volume of the hydraulic pump controlled on the engine side reduced to a minimum when the operating mode is the third operating mode, the motor vehicle being in a coasting state without an engine running in the third operating mode.

5. The method of claim 1, wherein controlling the cooling valve comprises controlling the cooling valve such that a gear set is cooled by the hydraulic pump controlled on the gear set side and a clutch is cooled by switching the hydraulic pump controlled on the gear set side when the operating mode is a third operating mode, a conveying volume of the hydraulic pump controlled on the engine side reduced to a minimum when the operating mode is the third operating mode, the motor vehicle being in a coasting state with an engine running in the third operating mode.

6. The method of claim 1, wherein controlling the cooling valve comprises controlling the cooling valve such that the hydraulic fluid is guided to an oil cooler by suction loading when the operating mode is a fourth operating mode, the motor vehicle being in a non-coasting state in the fourth operating mode.

7. A method for controlling a hydraulic fluid supply system of an automatic transmission of a motor vehicle, comprising:
supplying the hydraulic fluid supply system with hydraulic fluid from at least one of a hydraulic pump controlled on an engine side and a hydraulic pump controlled on a gear set side;
controlling a cooling valve of the hydraulic fluid supply system as a function of detected motor vehicle parameters in order to set an adjusted power distribution with the hydraulic pump controlled on the engine side and the hydraulic pump controlled on the gear set side; and
determining an operating mode of the motor vehicle for the cooling valve as a function of the detected motor vehicle parameters;
wherein the detected vehicle parameters comprise one or more of a launch control status, a motor vehicle speed, a transmission oil temperature, a driving program status, a motor vehicle longitudinal acceleration, an engine torque, a start-stop operation status and a slip operation status; and
wherein controlling the cooling valve comprises controlling the cooling valve such that the hydraulic pump controlled on the gear set side is supported by the hydraulic pump controlled on the engine side for cooling a gear set when the operating mode is a second operating mode, the motor vehicle being in a coasting driving state with an engine running at low speed in the second operating mode.

8. A method for controlling a hydraulic fluid supply system of an automatic transmission of a motor vehicle, comprising:
supplying the hydraulic fluid supply system with hydraulic fluid from at least one of a hydraulic pump controlled on an engine side and a hydraulic pump controlled on a gear set side;
controlling a cooling valve of the hydraulic fluid supply system as a function of detected motor vehicle parameters in order to set an adjusted power distribution with the hydraulic pump controlled on the engine side and the hydraulic pump controlled on the gear set side; and
determining an operating mode of the motor vehicle for the cooling valve as a function of the detected motor vehicle parameters;
wherein the detected vehicle parameters comprise one or more of a launch control status, a motor vehicle speed, a transmission oil temperature, a driving program status, a motor vehicle longitudinal acceleration, an engine torque, a start-stop operation status and a slip operation status; and
wherein controlling the cooling valve comprises controlling the cooling valve such that a gear set is cooled by the hydraulic pump controlled on the gear set side and a clutch is cooled by switching the hydraulic pump controlled on the gear set side when the operating mode is a third operating mode, a conveying volume of the hydraulic pump controlled on the engine side reduced to a minimum when the operating mode is the third operating mode, the motor vehicle being in a coasting state without an engine running in the third operating mode.

9. A method for controlling a hydraulic fluid supply system of an automatic transmission of a motor vehicle, comprising:
supplying the hydraulic fluid supply system with hydraulic fluid from at least one of a hydraulic pump controlled on an engine side and a hydraulic pump controlled on a gear set side;
controlling a cooling valve of the hydraulic fluid supply system as a function of detected motor vehicle parameters in order to set an adjusted power distribution with the hydraulic pump controlled on the engine side and the hydraulic pump controlled on the gear set side; and
determining an operating mode of the motor vehicle for the cooling valve as a function of the detected motor vehicle parameters;
wherein the detected vehicle parameters comprise one or more of a launch control status, a motor vehicle speed, a transmission oil temperature, a driving program status, a motor vehicle longitudinal acceleration, an engine torque, a start-stop operation status and a slip operation status; and
wherein controlling the cooling valve comprises controlling the cooling valve such that a gear set is cooled by the hydraulic pump controlled on the gear set side and a clutch is cooled by switching the hydraulic pump controlled on the gear set side when the operating mode is a third operating mode, a conveying volume of the hydraulic pump controlled on the engine side reduced to a minimum when the operating mode is the third operating mode, the motor vehicle being in a coasting state with an engine running in the third operating mode.

10. A method for controlling a hydraulic fluid supply system of an automatic transmission of a motor vehicle, comprising:

supplying the hydraulic fluid supply system with hydraulic fluid from at least one of a hydraulic pump controlled on an engine side and a hydraulic pump controlled on a gear set side;

controlling a cooling valve of the hydraulic fluid supply system as a function of detected motor vehicle parameters in order to set an adjusted power distribution with the hydraulic pump controlled on the engine side and the hydraulic pump controlled on the gear set side; and determining an operating mode of the motor vehicle for the cooling valve as a function of the detected motor vehicle parameters;

wherein the detected vehicle parameters comprise one or more of a launch control status, a motor vehicle speed, a transmission oil temperature, a driving program status, a motor vehicle longitudinal acceleration, an engine torque, a start-stop operation status and a slip operation status; and wherein controlling the cooling valve comprises controlling the cooling valve such that the hydraulic fluid is guided to an oil cooler by suction loading when the operating mode is a fourth operating mode, the motor vehicle being in a non-coasting state in the fourth operating mode.

\* \* \* \* \*